(12) United States Patent
Mega et al.

(10) Patent No.: US 11,131,198 B2
(45) Date of Patent: Sep. 28, 2021

(54) UNIDIRECTIONALLY SOLIDIFIED ARTICLE, TURBINE ROTOR BLADE AND UNIDIRECTIONALLY SOLIDIFIED ARTICLE REPAIR METHOD

(71) Applicant: MITSUBISHI HEAVY INDUSTRIES, LTD., Tokyo (JP)

(72) Inventors: Masahiko Mega, Tokyo (JP); Shuji Tanigawa, Tokyo (JP); Takahiro Tachibana, Tokyo (JP); Hiroki Komuro, Tokyo (JP); Koji Tsukimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 105 days.

(21) Appl. No.: 16/680,752

(22) Filed: Nov. 12, 2019

(65) Prior Publication Data
US 2020/0300094 A1  Sep. 24, 2020

(30) Foreign Application Priority Data
Mar. 19, 2019  (JP) .............................. JP2019-051032

(51) Int. Cl.
*F01D 5/14*  (2006.01)

(52) U.S. Cl.
CPC .......... *F01D 5/147* (2013.01); *F05D 2230/80* (2013.01); *F05D 2300/17* (2013.01)

(58) Field of Classification Search
CPC ........ F01D 5/147; F01D 5/28; F05D 2230/80; F05D 2240/80; F05D 2300/17
See application file for complete search history.

(56) References Cited

U.S. PATENT DOCUMENTS

| 5,156,321 A | 10/1992 | Liburdi et al. |
| 6,872,912 B1* | 3/2005 | Wos ...................... B23K 26/18 |
| | | 219/121.64 |
| 7,568,609 B2* | 8/2009 | Shimohata .............. C30B 29/52 |
| | | 228/119 |

(Continued)

FOREIGN PATENT DOCUMENTS

| CN | 101272880 | 9/2008 |
| CN | 104284752 | 1/2015 |

(Continued)

OTHER PUBLICATIONS

Office Action dated Jul. 2, 2021 in corresponding Chinese Patent Application No. 201911155923.3, with Machine Translation, 19 pages.

(Continued)

*Primary Examiner* — Ninh H. Nguyen
(74) *Attorney, Agent, or Firm* — Wenderoth, Lind & Ponack, L.L.P.

(57) ABSTRACT

A unidirectionally solidified article repair method according to one embodiment includes a step of forming a groove part overlapping only on one of a plurality of crystal grain boundaries in a base material made of a unidirectionally solidified alloy in which the plurality of crystal grain boundaries are aligned in one direction, and a step of forming a welded part having a metal composition similar to that of the base material by a metal used in welding with the base material in the groove part.

6 Claims, 10 Drawing Sheets

(56) References Cited

U.S. PATENT DOCUMENTS

| | | | |
|---|---|---|---|
| 8,426,765 B2* | 4/2013 | Arjakine | B23K 35/3033 219/121.61 |
| 2010/0000976 A1 | 1/2010 | Ott et al. | |
| 2010/0205805 A1 | 8/2010 | Mega et al. | |
| 2013/0302533 A1 | 11/2013 | Bruck | |
| 2014/0366996 A1 | 12/2014 | Goncharov et al. | |
| 2015/0108098 A1* | 4/2015 | Arjakine | B23K 26/34 219/76.14 |
| 2018/0073550 A1 | 3/2018 | Kern et al. | |

FOREIGN PATENT DOCUMENTS

| | | |
|---|---|---|
| CN | 107427949 | 12/2017 |
| JP | 2001-288554 | 10/2001 |
| JP | 4696325 | 6/2011 |
| JP | 5468471 | 4/2014 |
| JP | 2015-155110 | 8/2015 |
| JP | 5835913 | 12/2015 |
| JP | 5959849 | 8/2016 |
| JP | 6370557 | 8/2018 |
| JP | 2018-167320 | 11/2018 |
| WO | 01/41970 | 6/2001 |
| WO | 2009/101912 | 8/2009 |

OTHER PUBLICATIONS

Chu et al., "Welding Thermal Simulation Techniques", Machine Industry Press, 1985, p. 126, 4 pages.
Guan-yu et al., "Rail Weld Repair Technology", China Railway Publishing House, 1988, pp. 72-73, 5 pages.

* cited by examiner

ARROW VIEW A

ARROW VIEW C II-C II

ARROW VIEW B II

EQUIVALENT TO ARROW VIEW A

ARROW VIEW C IV-C IV

ARROW VIEW B IV

EQUIVALENT TO ARROW VIEW A

ARROW VIEW C V-C V

ARROW VIEW B V

EQUIVALENT TO ARROW VIEW A

EQUIVALENT TO ARROW VIEW A

ARROW VIEW C VII-C VII

ARROW VIEW B VII

EQUIVALENT TO ARROW VIEW A

ARROW VIEW C VIII-C VIII

ARROW VIEW B VIII

ARROW VIEW C IX-C IX

ARROW VIEW B IX

UNIDIRECTIONALLY SOLIDIFIED ARTICLE, TURBINE ROTOR BLADE AND UNIDIRECTIONALLY SOLIDIFIED ARTICLE REPAIR METHOD

TECHNICAL FIELD

The present disclosure relates to a unidirectionally solidified article, a turbine rotor blade and a unidirectionally solidified article repair method.

BACKGROUND

A unidirectionally solidified article is known as a material suitable for a structure used under a high-temperature environment. The unidirectionally solidified article can drastically improve a creep rupture resistant temperature and a fatigue life as compared to conventional cast alloys, and is used for turbine blades of gas turbines, aircraft engines and the like.

However, even a turbine blade or the like using such a unidirectionally solidified article may be cracked by the use of the turbine blade or the like. Thus, the cracked turbine blade or the like needs to be repaired.

For example, Patent Document 1 discloses a repair method for a heat resistant alloy member having a crystal structure controlled unidirectionally or in a monocrystalline manner (see Patent Document 1).

CITATION LIST

Patent Literature

Patent Document 1: JP2001-288554A

SUMMARY

For example, in a turbine rotor blade made of a unidirectionally solidified article, a relatively deep crack is easily formed in a crystal grain boundary between columnar crystals of the unidirectionally solidified article in a part where a stress is relatively high and a fatigue crack is easily formed such as a platform part.

Thus, a repair method for a relatively deep crack as described above is desired.

However, in the repair method for the heat resistant alloy member described in the above Patent Document 1, a repair method for a relatively shallow crack of about 2 mm is disclosed, but a repair method for a deeper crack is not disclosed.

In view of the above situation, at least one embodiment of the present disclosure aims to provide a repair method for a relatively deep crack in a unidirectionally solidified article.

(1) A unidirectionally solidified article according to at least one embodiment of the present disclosure includes a base material made of a unidirectionally solidified alloy in which a plurality of crystal grain boundaries are aligned in one direction, and a welded part provided in a groove part of the base material, the welded part having a metal composition similar to that of the base material, the welded part being formed by a metal used in welding with the base material, the welded part overlapping only on one of the plurality of crystal grain boundaries.

For example, if the welded part is formed to overlap also on another crystal grain boundary different from the one crystal grain boundary to repair a crack formed in the one crystal grain boundary, there is a possibility that a crack is easily formed in the other crystal grain boundary, for example, due to an influence by the formation of the welded part such as a thermal influence at the time of forming the welded part even if the other crystal grain boundary is a crack-free sound crystal grain boundary.

In that respect, since the welded part does not overlap on the other crystal grain boundaries according to the above configuration (1), it can be suppressed that the other crystal grain boundaries are affected by the formation of the welded part.

Further, the strength of the welded part may become drastically lower than that of the base material, for example, if the welded part is formed using an alloy material different from the base material to improve weldability.

In that respect, since the welded part has a metal composition similar to that of the base material according to the above configuration (1), the strength of the unidirectionally solidified article can be ensured.

(2) In several embodiments, in the above configuration (1), the welded part includes a first layer and a second layer adjacent to the first layer in a depth direction of the groove part, and each of the first layer and the second layer is formed by one bead.

In the case of multi-layer welding of welding a plurality of layers in a depth direction of a groove part, a chance of giving a thermal influence to the periphery of the groove part at the time of welding increases as the number of beads in each layer increases.

In that respect, since each of the first and second layers has one bead according to the above configuration (2), the thermal influence given to the periphery of the groove part at the time of welding can be suppressed.

(3) In several embodiments, in the above configuration (2), a ratio of a height of the bead to a width of the bead is 0.8 or less.

If each layer has one bead as in the above configuration (2), the bottom surface of each bead is in contact with the base material or the bead of the lower layer and both side surfaces thereof are in contact with the base material. Thus, in the process of cooling and solidifying the melted bead, thermal energy possessed by the bead is transferred from the bottom surface and the both side surfaces to the periphery, whereby the bead is cooled.

Here, as the ratio of the height of the bead to the width of the bead increase, areas of the side surfaces of the bead increases with respect to an area of the bottom surface of the bead. Thus, as the ratio of the height of the bead to the width of the bead increases, the thermal energy possessed by the bead is more easily transferred to the periphery from the both side surfaces than from the bottom surface.

In the process of solidifying the bead, a region where temperature easily decreases first starts being solidified and a region where temperature hardly decreases is solidified later. Thus, as the ratio of the height of the bead to the width of the bead increases, the solidification of the bead more easily proceeds from the both side surfaces toward a widthwise center. Conversely, as the ratio of the height of the bead to the width of the bead decreases, the solidification of the bead more easily proceeds from the bottom surface toward the upper surface.

If the solidification of the bead proceeds from the both side surfaces of the bead toward the widthwise center, a liquid phase part near the widthwise center may be opened and solidification cracking may occur if the bead shrinks to generate a thermal stress as the bead is solidified. To prevent such solidification cracking, it is desirable to make the solidification of the bead easily proceed from the bottom surface to the upper surface by reducing the ratio of the height of the bead to the width of the bead.

As a result of the earnest study of the inventors, it was found that, when each layer had one bead as in the above configuration (2), the solidification cracking as described above could be suppressed if the ratio of the height of the bead to the width of the bead was 0.8 or less.

Therefore, the solidification cracking as described above can be suppressed according to the above configuration (3).

(4) In several embodiments, in any one of the above configurations (1) to (3), an extending direction of a bead is a direction along a growth direction of columnar crystals in the base material.

When a crack along one crystal grain boundary is formed in the unidirectionally solidified article before the welded part is formed, the extending direction of the bead is the same as an extending direction of the crack if the extending direction of the bead is the direction along the growth direction of the columnar crystals in the base material as in the above configuration (4). Therefore, the extending direction of the bead is a direction suitable for repairing the crack according to the above configuration (4).

(5) In several embodiments, in any one of the above configurations (1) to (4), the base material and the welded part are made of a nickel-based alloy or cobalt-based alloy.

According to the above configuration (5), the high-temperature strength of the unidirectionally solidified article can be ensured by making the base material and the welded part of the nickel-based alloy or cobalt-based alloy.

(6) A turbine rotor blade according to at least one embodiment of the present disclosure includes any one of the above configurations (1) to (5). Thus, it can be suppressed that the other crystal grain boundaries are affected by the formation of the welded part.

Further, since the welded part has a metal composition similar to that of the base material according to the above configuration (6), the strength of the turbine rotor blade can be ensured.

(7) A unidirectionally solidified article repair method according to at least one embodiment of the present disclosure includes a step of forming a groove part overlapping only on one of a plurality of crystal grain boundaries in a base material made of a unidirectionally solidified alloy in which the plurality of crystal grain boundaries are aligned in one direction, and a step of forming a welded part having a metal composition similar to that of the base material by a metal used in welding with the base material in the groove part.

As described above, if the groove part and the welded part are formed to overlap also on another crystal grain boundary different from the one crystal grain boundary, for example, to repair a crack formed in the one crystal grain boundary, there is a possibility that a crack is easily formed in the other crystal grain boundary, for example, due to an influence by the formation of the welded part such as a thermal influence at the time of forming the welded part even if the other crystal grain boundary is a crack-free sound crystal grain boundary.

In that respect, since the welded part does not overlap on the other crystal grain boundaries according to the above method (7), it can be suppressed that the other crystal grain boundaries are affected by the formation of the welded part.

Further, as described above, the strength of the welded part may become drastically lower than that of the base material, for example, if the welded part is formed using an alloy material different from the base material to improve weldability.

In that respect, since the welded part has a metal composition similar to that of the base material according to the method (7), the strength of the repaired unidirectionally solidified article can be ensured.

(8) In several embodiments, in the above method (7), the welded part including a first layer having one bead and a second layer adjacent to the first layer in a depth direction of the groove part and having one bead is formed in the welded part forming step.

As described above, in the case of multi-layer welding of welding a plurality of layers in a depth direction of a groove part, a chance of giving a thermal influence to the periphery of the groove part at the time of welding increases as the number of beads in each layer increases.

In that respect, since each of the first and second layers has one bead according to the above method (8), the thermal influence given to the periphery of the groove part at the time of welding can be suppressed.

(9) In several embodiments, in the above method (8), the first layer and the second layer having a ratio of a height of the bead to a width of the bead of 0.8 or less are formed in the welded part forming step.

As described above, it was found that, when each layer had one bead, the solidification cracking as described above could be suppressed if the ratio of the height of the bead to the width of the bead was 0.8 or less.

Therefore, the solidification cracking as described above can be suppressed according to the above method (9).

(10) In several embodiments, in any one of the above methods (7) to (9), the groove part is formed to extend along a growth direction of columnar crystals in the base material in the groove part forming step, and the welded part is formed by welding along the growth direction in the groove part in the welded part forming step.

When a crack along the one crystal grain boundary is formed in the unidirectionally solidified article before the welded part is formed, extending directions of the groove part and the welded part are the same as an extending direction of the crack if the extending direction of the groove part is a direction along the growth direction of the columnar crystals in the base material. Therefore, the above method (10) is a repair method suitable for repairing the crack.

(11) In several embodiments, any one of the above methods (7) to (10) further includes a step of forming a pair of tabs, one at either end of a region of the base material where the welded part is formed with respect to a growth direction of columnar crystals in the base material, prior to the welding part forming step, wherein the groove part is formed in the region and the pair of tabs beyond the region in the groove part forming step, and the welded part is formed in the groove part by welding from one of the pair of tabs to the other of the pair of tabs through the region in the welded part forming step.

At a welding start position and a welding end position in one welding path, i.e. at both end parts of a bead, a state of heat input at the time of welding is different from that in a part other than the both end parts by starting or ending the welding. Further, since the bead is not present outside the both end parts with respect to the extending direction of the bead, how thermal energy at the time of cooling escapes at the both end parts of the bead is different from that in the part other than the both end parts. Thus, a crack may be easily formed or it may be difficult to ensure strength or the like near the both end parts.

In that respect, since welding is performed from one of the pair of tabs to the other of the pair of tabs through the region according to the above method (11), the both ends of the bead are located on the pair of tabs and the part of the bead other than the both end parts is located in the region of the base material where the welded part is formed. Therefore, the strength of the welded part in the region can be ensured.

(12) In several embodiments, in the above method (11), the pair of tabs are formed to form a heat conduction path between the base material and the pair of tabs in the tab forming step.

If the heat conduction path is insufficiently formed between the tabs and the base material, thermal energy by welding may be insufficiently transferred to the base material and the temperatures of the tabs may excessively increase when the welded part is formed on the tabs. Depending on welding conditions, the tabs may be melted and dropped.

In that respect, since the thermal energy by welding can be sufficiently transferred to the base material according to the above method (12), excessive temperature increases of the tabs can be suppressed.

(13) In several embodiments, in the above method (11) or (12), the tabs are formed of a material different from a material of the base material in the tab forming step.

According to the above method (13), the tabs are easily formed by using a material with which the tabs are easily formed.

(14) In several embodiments, in any one of the above methods (7) to (13), the welded part is formed by any one of a laser metal deposition method, a cold spray method or a high-speed frame spraying method in the welded part forming step.

According to the above method (14), the welded part having a metal composition similar to that of the base material can be provided in the groove part even if the base material is a material difficult to weld.

(15) In several embodiments, in the above method (14), the welded part is formed by irradiating a laser beam with a rectangular beam pattern larger along a direction orthogonal to a growth direction of columnar crystals in the base material than along the growth direction in the welded part forming step.

As a result of the earnest study of the inventors, if the amount of heat input in the laser metal deposition method is too much, the base material below the bead to be formed or the bead in the lower layer is melted more than necessary. Thus, the amount of heat input is desirably suppressed so as not to be excessive. To that end, it is considered to suppress the size of a pattern of the laser beam in a scanning direction at the position of the bead or to increase a scanning speed.

However, if the scanning speed is increased, the laser beam is separated from the formed bead in a short time. Thus, a cooling rate of the formed bead is increased and a thermal stress in the bead tends to be high. Therefore, the scanning speed is desirably reduced. Further, if the scanning speed is reduced from the perspective of the amount of heat input as described above, the size of the pattern of the laser beam in the scanning direction at the position of the bead is desirably suppressed.

Accordingly, if the scanning direction of the laser beam is the same direction as the growth direction, it can be suppressed that the base material below the bead to be formed or the bead in the lower layer is melted more than necessary while the thermal stress of the bead is suppressed, and the strength of the repaired unidirectionally solidified article can be ensured by shaping the beam pattern according to the above method (15).

(16) In several embodiments, in the above method (14) or (15), in the welded part forming step, the welded part including a first layer having one bead and a second layer adjacent to the first layer in a depth direction of the groove part and having one bead is formed, and the first layer is formed by irradiating a laser beam with a rectangular beam pattern having a dimension along a direction orthogonal to a growth direction of columnar crystals in the base material smaller than a width of the groove part in a surface of the base material.

According to the above method (16), it can be prevented that a region outside the groove part on the surface of the base material, which region needs not be irradiated with the laser beam when the first layer is formed, is irradiated with the laser beam.

(17) In several embodiments, in any one of the above methods (14) to (16), the welded part is formed by scanning a laser beam along a growth direction of columnar crystals in the base material in the welded part forming step.

When a crack along the one crystal grain boundary is formed in the unidirectionally solidified article, a scanning direction of the laser beam, i.e. an extending direction of the bead is the same direction as an extending direction of the crack if the scanning direction of the laser beam is a direction along the growth direction of the columnar crystals in the base material. Therefore, according to the above method (17), the scanning direction of the laser beam is a direction suitable for repairing the crack.

(18) In several embodiments, in the above method (17), the welded part is formed by scanning the laser beam at a scanning speed of 20 mm/min or less in the welded part forming step.

As described above, the scanning speed of the laser beam is desirably reduced from the perspective of suppressing a thermal stress in the bead.

As a result of the earnest study of the inventors, it was found to be good to form the welded part by scanning the laser beam at a scanning direction of 20 mm/min or less.

Therefore, according to the above method (18), the thermal stress of the bead can be suppressed, and the strength of the repaired unidirectionally solidified article can be ensured.

(19) In several embodiments, any one of the above methods (7) to (18) further includes a step of heating at least a partial region of the base material including the groove part, wherein the welded part is formed in the welded part forming step while the partial region is heated in the heating step.

According to the above method (19), the strength of the partial region can be temporarily reduced by heating the partial region. Therefore, a stress generated in the welded part can be reduced by forming the welded part while heating the partial region.

(20) In several embodiments, in the above method (19), the welded part including a first layer having one bead and a second layer adjacent to the first layer in a depth direction of the groove part and having one bead is formed in the welded part forming step.

According to the above method (20), stresses generated in the first and second layers can be reduced.

(21) Since a turbine rotor blade according to at least one embodiment of the present disclosure is repaired by any one of the above unidirectionally solidified article repair methods (7) to (20), it can be suppressed that the other crystal grain boundaries are affected by the formation of the welded part.

Further, since the welded part has a metal composition similar to that of the base material according to the above configuration (21), the strength of the turbine rotor blade can be ensured.

According to at least one embodiment of the present disclosure, a relatively deep crack in a unidirectionally solidified article can be repaired.

DETAILED DESCRIPTION

Figure 1:
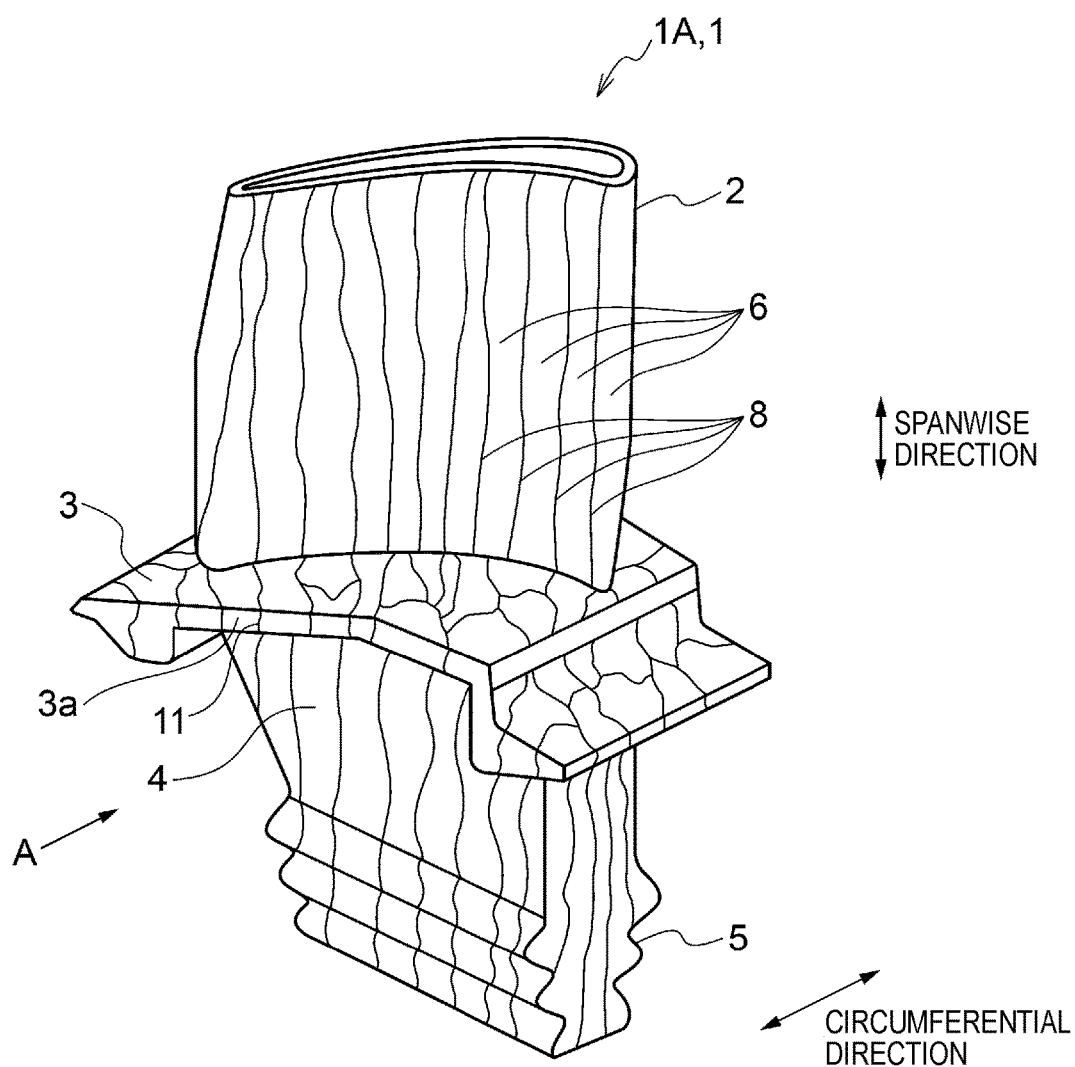
FIG. 1 is a perspective diagram showing an example of a unidirectionally solidified article according to several embodiments.

Several embodiments of the present disclosure will be described with reference to the accompanying drawings. It is intended, however, that dimensions, materials, shapes, relative positions and the like of components described in the embodiments or shown in the drawings shall be interpreted as illustrative only and not limitative of the scope of the present disclosure.

For example, an expression indicating a relative or absolute arrangement such as "in a certain direction", "along a certain direction", "parallel", "orthogonal", "center", "concentric" or "coaxial" shall be interpreted as not only strictly indicating such an arrangement, but also indicating a relatively displaced state with a tolerance or at such an angle or with such a distance as to provide the same functions.

For example, expressions representing a state where things are equal such as "same", "equal" and "homogeneous" shall be interpreted as not only strictly indicating an equal state, but also indicating a state where a tolerance or such a difference as to provide same functions is present.

For example, an expression indicating a shape such as a rectangular shape or a cylindrical shape shall be interpreted as not only indicating a shape such as a rectangular shape or a cylindrical shape in a geometrically strict sense, but also indicating a shape including an uneven part or a chamfered part in such a range that the same effects are obtained.

On the other hand, an expression such as "comprise", "include", "have", "contain" and "constitute" are not intended to be exclusive of other components.

FIG. 1 is a perspective diagram showing an example of a unidirectionally solidified article according to several embodiments. As shown in FIG. 1, the unidirectionally solidified article 1 is a turbine rotor blade 1A and is provided with a blade portion 2, a platform 3, a shank 4, and a blade root 5. The turbine rotor blade 1A shown in FIG. 1 is an integral structure formed by casting a nickel-based unidirectionally solidified alloy. It should be noted that the turbine rotor blade 1A shown in FIG. 1 may be an integral structure formed by casting a cobalt-based unidirectionally solidified alloy.

The turbine rotor blade 1A shown in FIG. 1 includes a plurality of columnar crystals 6 extending in a spanwise direction, which is a vertical direction in FIG. 1. That is, a plurality of crystal grain boundaries 8 are aligned in one direction in the turbine rotor blade 1A shown in FIG. 1.

It should be noted that, if the turbine rotor blade 1A is a gas turbine rotor blade, the size (overall length in the vertical direction in FIG. 1) of this rotor blade is generally about 150 to 500 mm. Further, intervals between the crystal grain boundaries 8 are generally about 10 mm.

A turbine rotor blade, particularly a turbine rotor blade applied to a power generation gas turbine, is used at a high temperature and the temperature thereof increases and decreases as a turbine is started and stopped. Thus, the turbine rotor blade may be cracked due to thermal fatigue caused by long term use. In this case, a relatively deep crack may be formed along the crystal grain boundary in the turbine rotor blade 1A as shown in FIG. 1. Here, the relatively deep crack is, for example, a crack having a crack depth of 2 mm or more.

Figure 2:
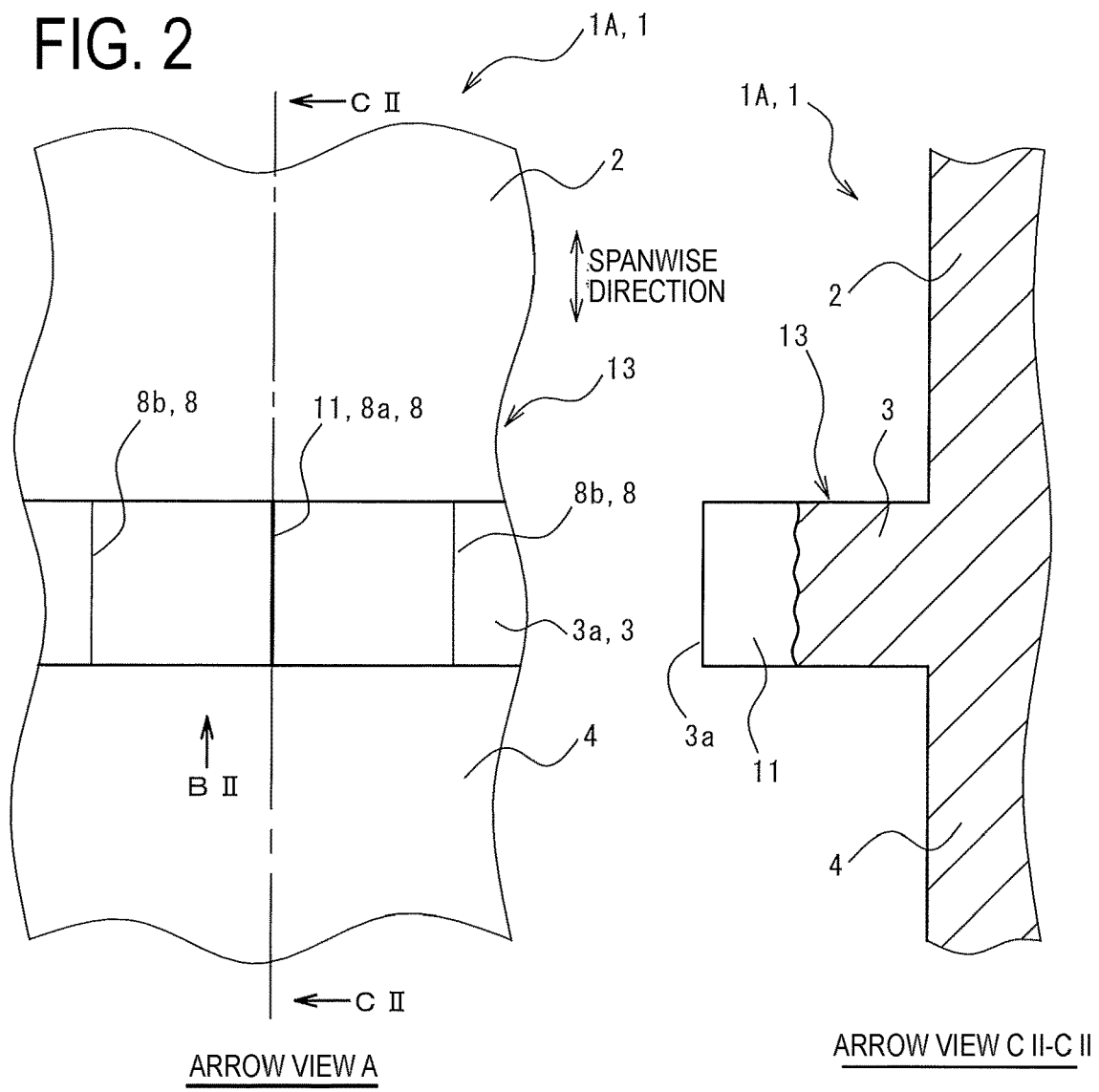
FIG. 2 is a figure illustrating an arrow view A of FIG. 1, an arrow view BII of the arrow view A and an arrow view CII-CII of the arrow view A.
Figure 2:
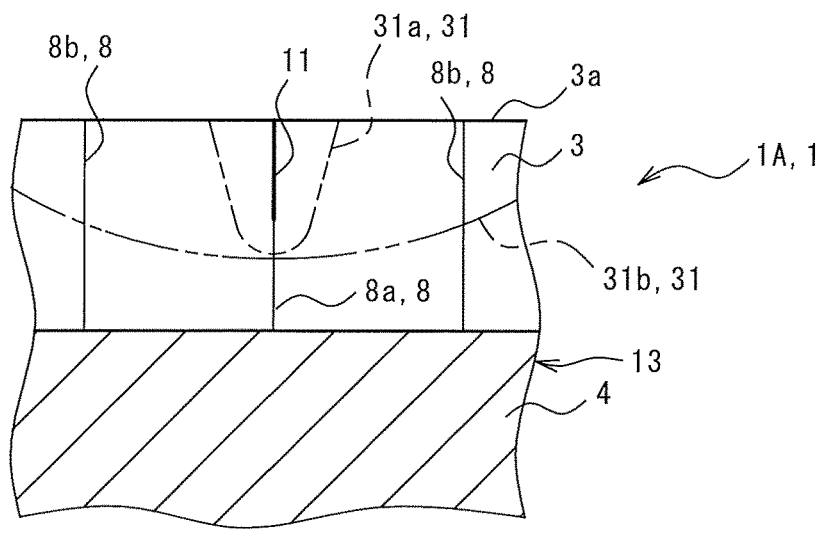

FIG. 2 is a figure illustrating an arrow view A of FIG. 1, an arrow view BII of the arrow view A and an arrow view CII-CII of the arrow view A. It should be noted that FIG. 2 is a figure, showing a case where a crack 11 is formed in an end surface 3a of the platform 3 with respect to a circumferential direction of an unillustrated turbine rotor, for example, in the turbine rotor blade 1A shown in FIG. 1. It should be noted that this crack 11 is assumed as a crack formed in the crystal grain boundary 8 and a depth direction thereof extends along the circumferential direction.

A method for repairing this crack 11 is described below when the crack 11 is formed in the end surface 3a of the platform 3 as shown in FIG. 2.

Figure 3:
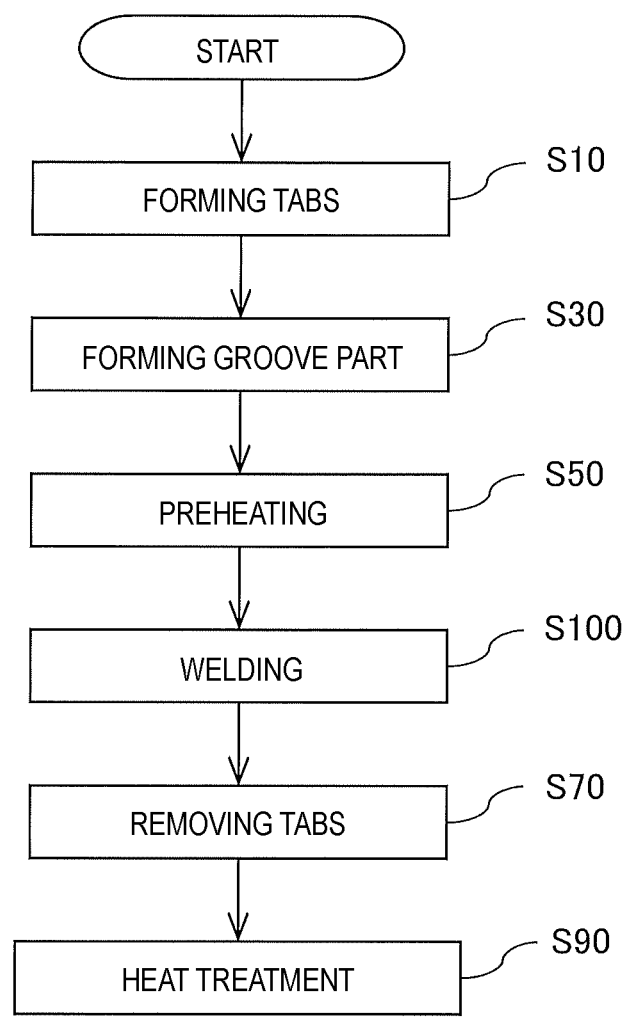
FIG. 3 is a flow chart showing a process procedure of a unidirectionally solidified article repair method according to several embodiments.

FIG. 3 is a flow chart showing a process procedure of a unidirectionally solidified article repair method according to several embodiments. The unidirectionally solidified article repair method according to several embodiments includes a tab forming step S10, a groove part forming step S30, a preheating step S50, a welding step S100, a tab removing step S70 and a heat treatment step S90.

(Tab Forming Step S10)

Figure 4:
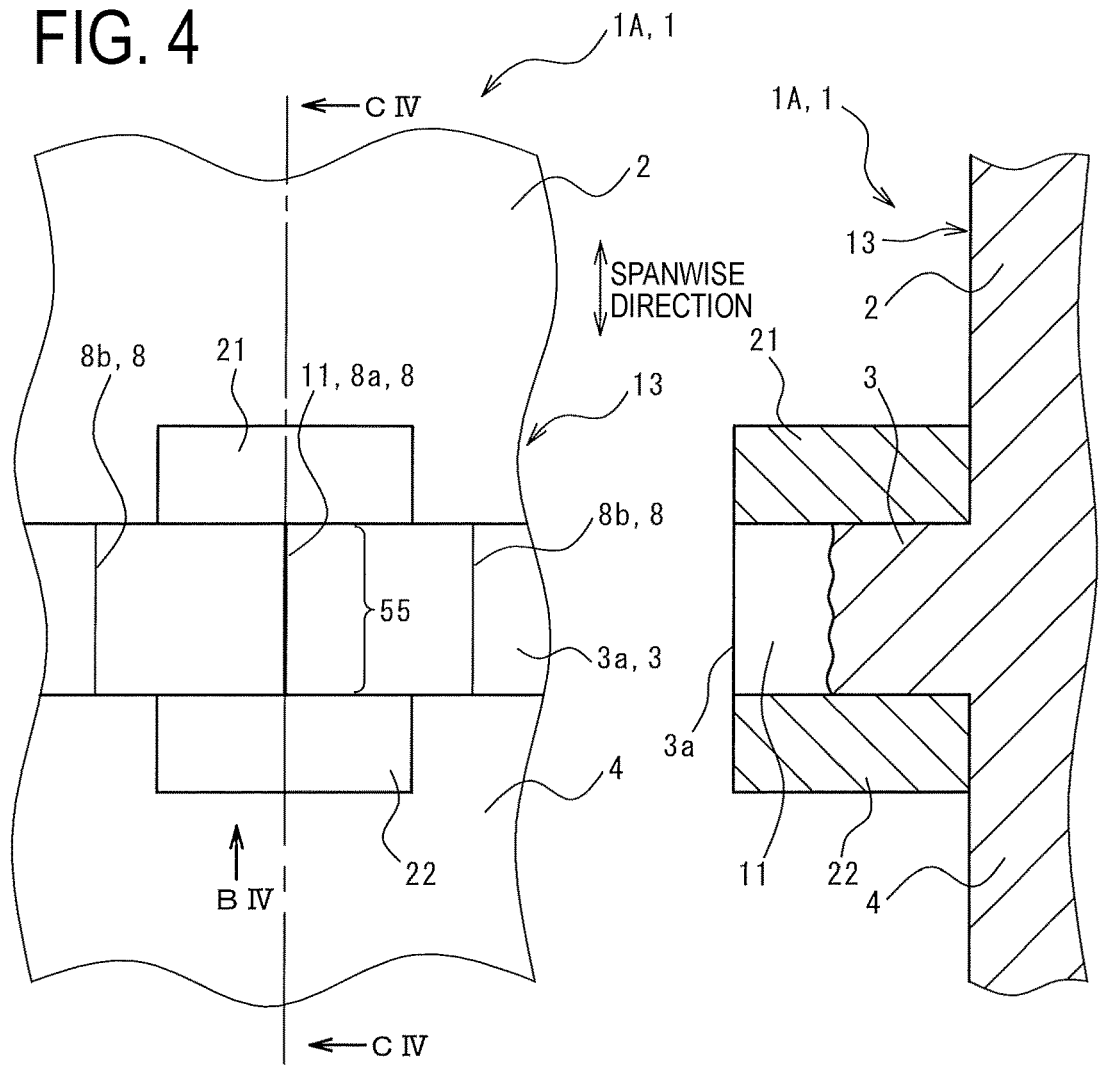
FIG. 4 is a figure showing a pair of tabs.
Figure 4:
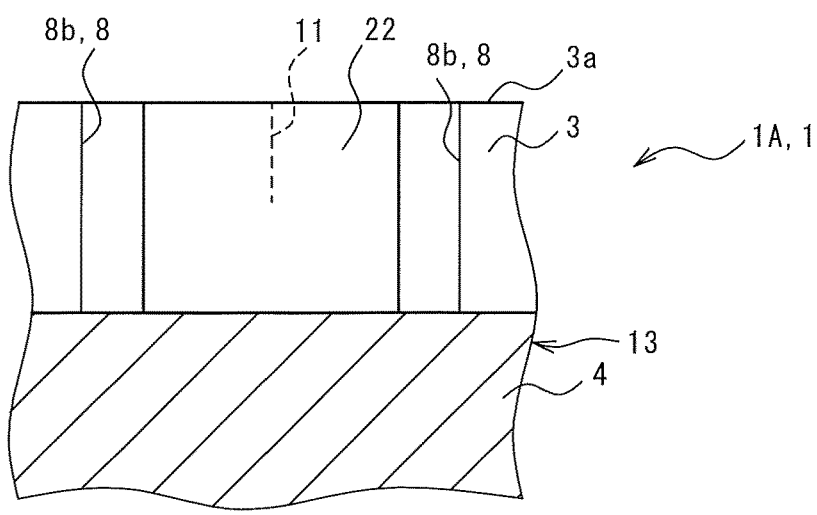

The tab forming step S10 is a step of forming a pair of tabs 21, 22, one at either end of a region (welding region) 55 of a base material 13 to be repaired where a welded part is formed with respect to a growth direction of the columnar crystals 6 in the base material 13 as shown in FIG. 4 prior to the welding step S100 to be described later. In the turbine rotor blade 1A shown in FIG. 1, the pair of tabs 21, 22 are formed to sandwich the platform 3 from both sides with respect to an extending direction of the crack of the platform 3, i.e. to sandwich the platform 3 on both ends with respect to the spanwise direction as shown in FIG. 4. It should be noted that FIG. 4 is a figure showing the pair of tabs 21, 22 and include a view equivalent to the arrow view A of FIG. 1, an arrow view BIV and an arrow view CIV-CIV of the former view.

Further, in the tab forming step S10, the pair of tabs 21, 22 are formed to form a heat conduction path between the platform 3, which is the base material 13, and the tabs 21, 22.

Why such tabs 21, 22 are formed will be described later.

It should be noted that the tabs 21, 22 may be formed of a material different from that of the base material 13 in the tab forming step S10. This facilitates the formation of the tabs.

In several embodiments, the tabs 21, 22 are formed, for example, by a laser metal deposition method. It should be noted that the tabs 21, 22 may be formed by mounting members having the shapes of the tabs 21, 22 to the turbine rotor blade 1A by welding or the tabs 21, 22 may be formed by spraying such as a cold spray method or high-speed frame spraying method.

If the members having the shapes of the tabs 21, 22 are mounted to the turbine rotor blade 1A by welding, a large-scale facility is not required and this is advantageous in terms of cost and time required for construction.

If the tabs 21, 22 are formed by the cold spray method or high-speed frame spraying method, the dilution of a material constituting the tabs 21, 22 in the turbine rotor blade 1A, which is a base material, can be suppressed and cracks of the turbine rotor blade 1A due to construction can be suppressed.

Further, if the tabs 21, 22 are formed by the cold spray method, a thermally affected part is not formed in the turbine rotor blade 1A when the tabs 21, 22 are formed. Thus, there is no influence on the strength of the turbine rotor blade 1A.

(Groove Part Forming Step S30)

The groove part forming step S30 is a step of forming a groove part 31 overlapping only on one of the plurality of crystal grain boundaries 8 in the base material 13 formed of a unidirectionally solidified alloy in which the plurality of crystal grain boundaries 8 are aligned in one direction.

Figure 5:
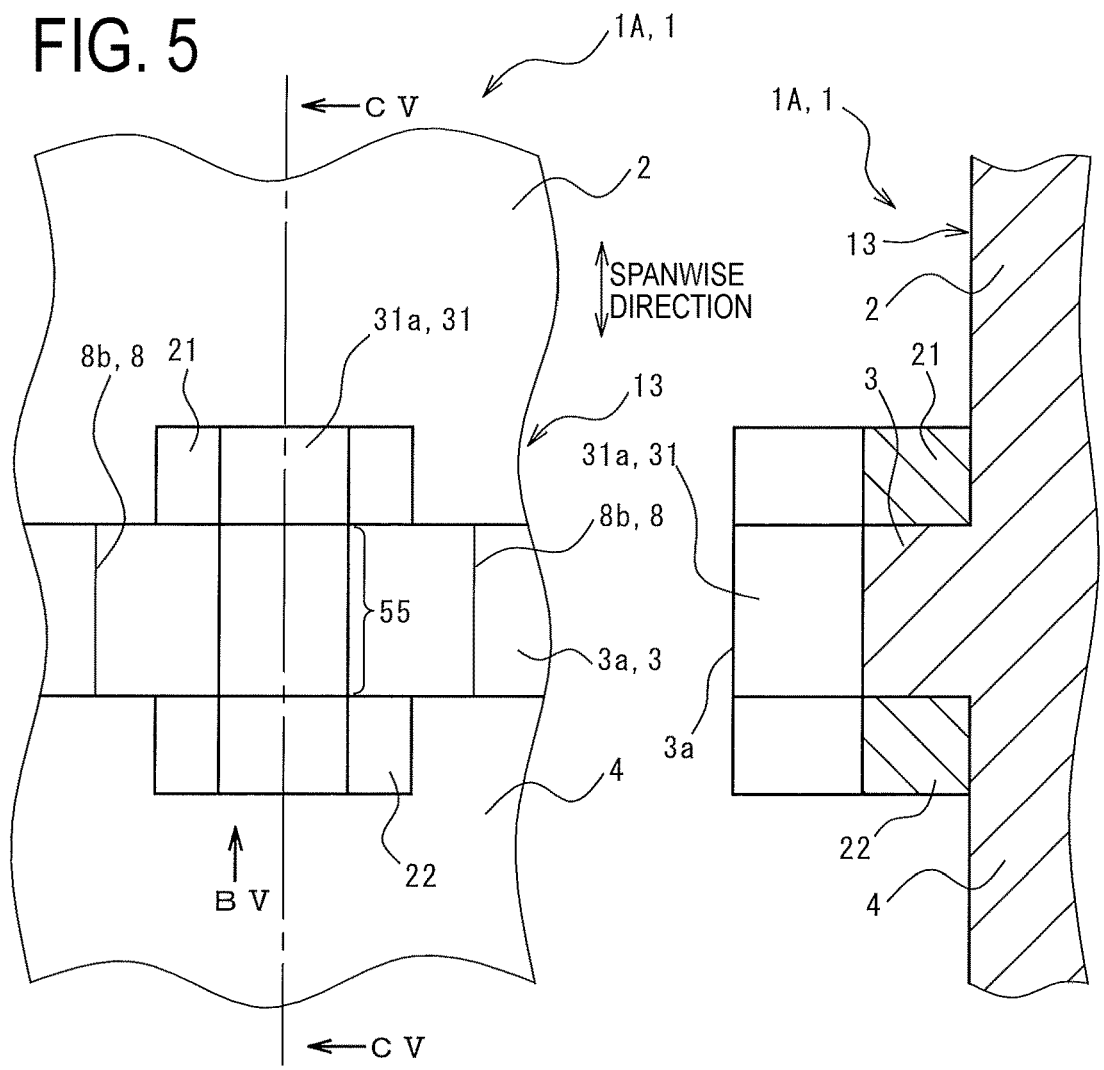
FIG. 5 is a figure showing a turbine rotor blade shown in FIG. 4 after a groove part is formed in the turbine rotor blade.
Figure 5:
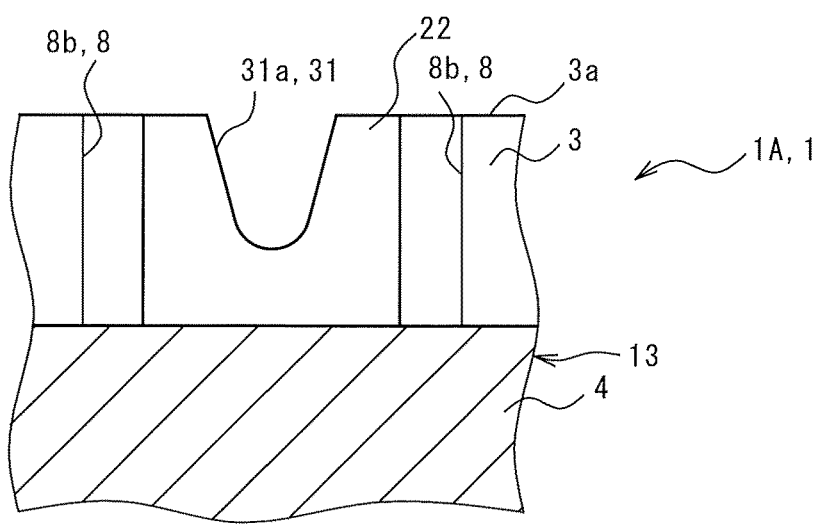

FIG. 5 is a figure showing the turbine rotor blade 1A after a groove part 31a (see FIG. 2) overlapping only on one crystal grain boundary 8a formed with the crack 11, out of the plurality of crystal grain boundaries 8, is formed in the turbine rotor blade 1A shown in FIG. 4.

As shown in FIG. 2, if a groove part 31b and a welded part 50 to be described later are, for example, formed to overlap also on another crystal grain boundary 8b different from the one crystal grain boundary 8a to repair the crack 11 formed in the one crystal grain boundary 8a, a crack may be easily formed in the other crystal grain boundary 8b due to an influence by the formation of the welded part 50 such as a thermal influence when the welded part 50 is formed even if the other crystal grain boundary 8b is a crack-free sound crystal grain boundary.

In that respect, according to the unidirectionally solidified article repair method according to several embodiments, since the welded part 50 does not overlap on the other crystal grain boundary 8b, it can be suppressed that the other crystal grain boundary 8b is affected by the formation of the welded part 50.

In the groove part forming step S30, the groove part 31 is formed to extend along the growth direction of the columnar crystals 6, i.e. the spanwise direction.

For example, if the crack 11 along the one crystal grain boundary 8a is formed in the turbine rotor blade 1A as shown in FIGS. 1 and 2, extending directions of the groove part 31 and the welded part 50 to be described later are the same as the extending direction of the crack 11 if the extending direction of the groove part 31 is a direction along the growth direction of the columnar crystals 6. Thus, the unidirectionally solidified article repair method according to several embodiments is a repair method suitable for repairing the crack 11.

In the groove part forming step S30, the groove part 31 is formed not only in the platform 3 to be repaired, but also in the pair of tabs 21, 22 as shown in FIG. 5. That is, in the groove part forming step S30, the groove part 31 is formed in the welding region 55 and the pair of tabs 21, 22 beyond the welding region 55.

(Preheating Step S50)

Figure 6:
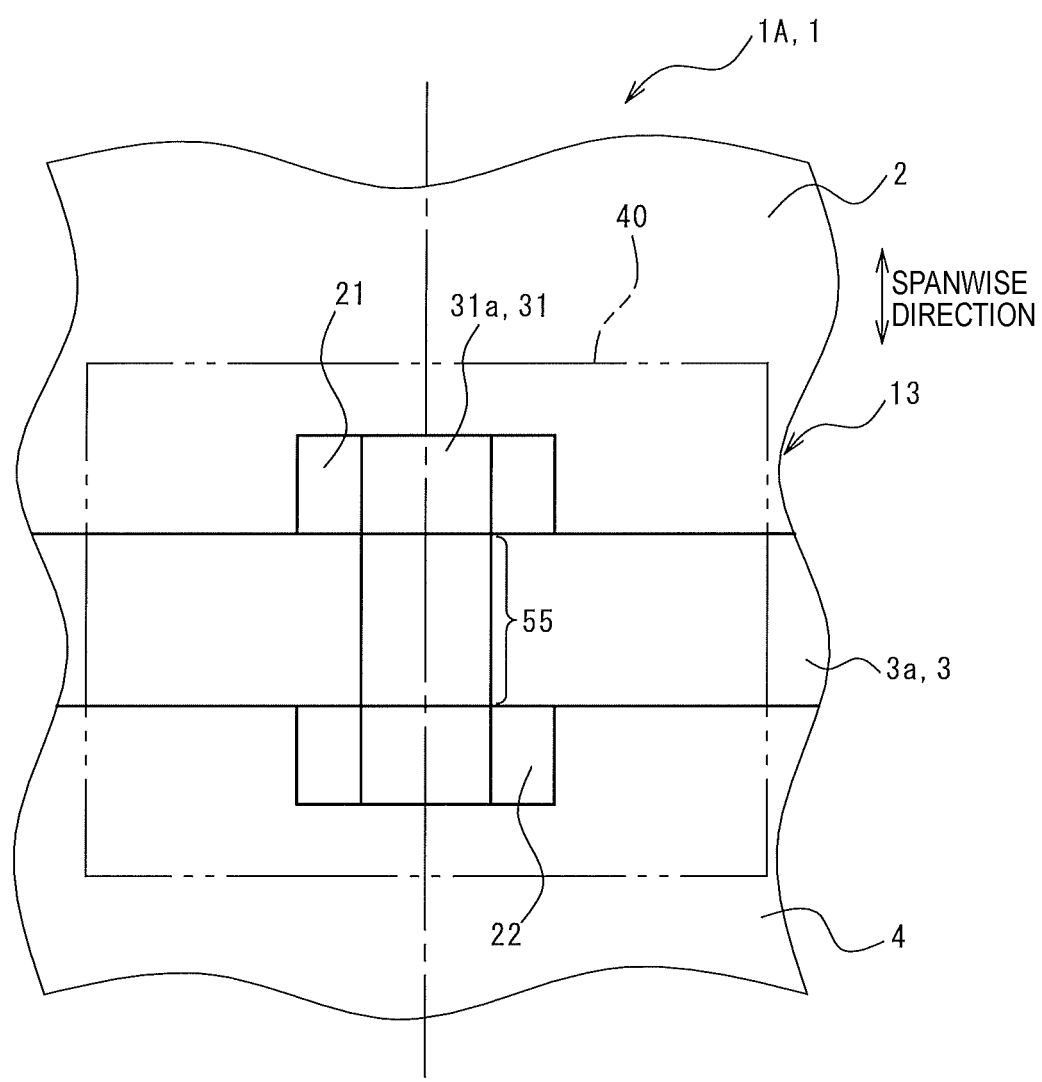
FIG. 6 is a view, equivalent to the arrow view A in FIG. 1, showing an example of a partial region.

The preheating step S50 is a step of heating at least a partial region 40 of the base material 13 including the groove part 31 as shown in FIG. 6.

FIG. 6 is a view equivalent to the arrow view A in FIG. 1 and showing an example of the partial region 40.

The strength of the partial region 40 can be temporarily reduced by heating the partial region 40. Thus, a stress generated in the welded part 50 to be described later can be reduced by forming the welded part 50 while heating the partial region 40.

In the preheating step S50, the partial region 40 is heated such that the temperature of the partial region 40 is maintained at 900° C. or higher and 1000° C. or lower.

It should be noted that, in the preheating step S50, the partial region 40 can be efficiently heated, for example, using a high-frequency induction heating coil (not shown) wound into such a shape as to enclose the partial region 40 from the periphery of the partial region 40. Further, by using the high-frequency induction heating coil (not shown) wound into such a shape as to enclose the partial region 40 from the periphery of the partial region 40, a laser beam can pass through the wound coil and the interference of the laser beam and the coil can be prevented when the welded part 50 is formed.

(Welding Step S100)

Figure 7:
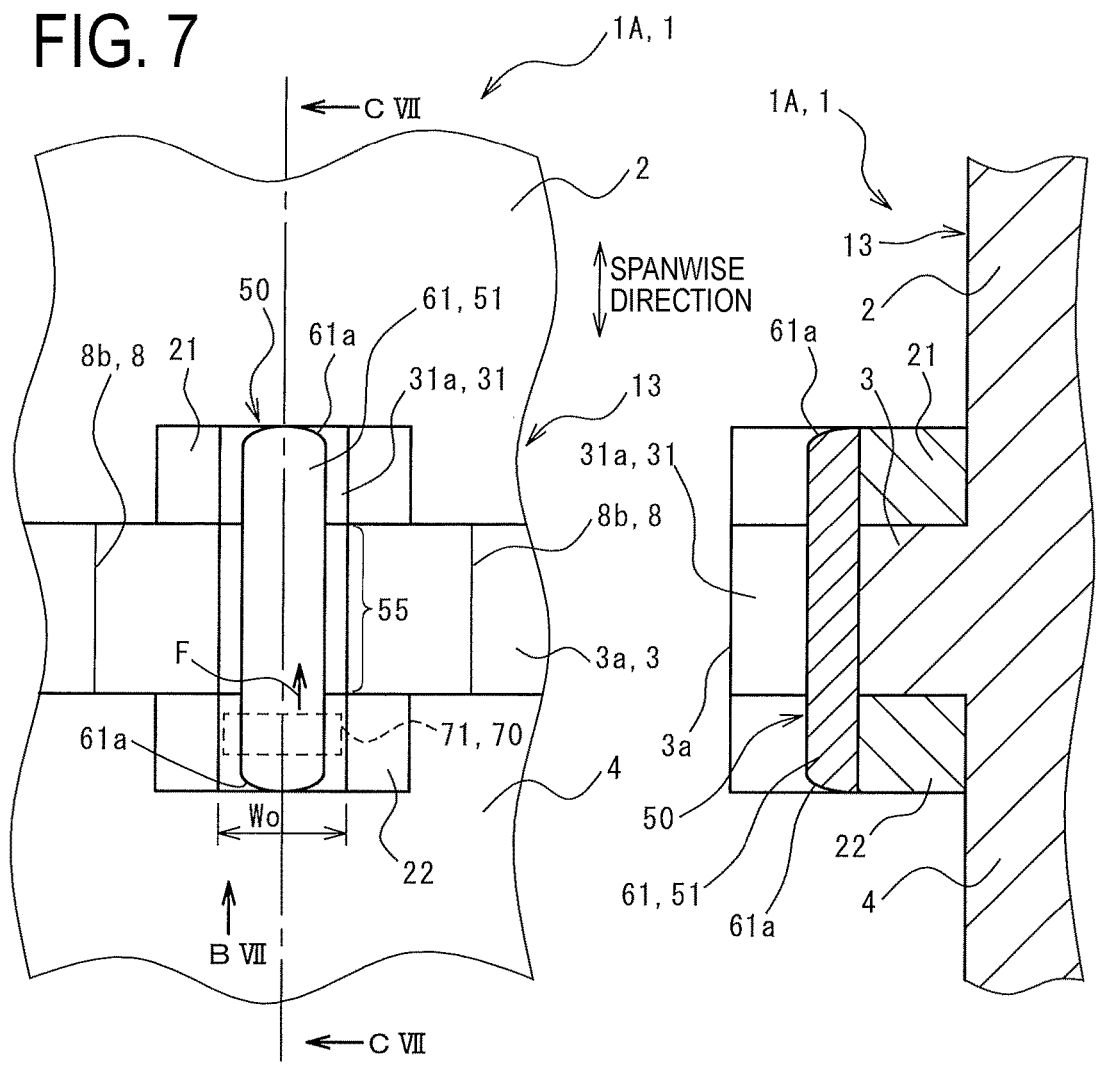
FIG. 7 is a figure showing a state after a first layer is formed in the groove part.
Figure 7:
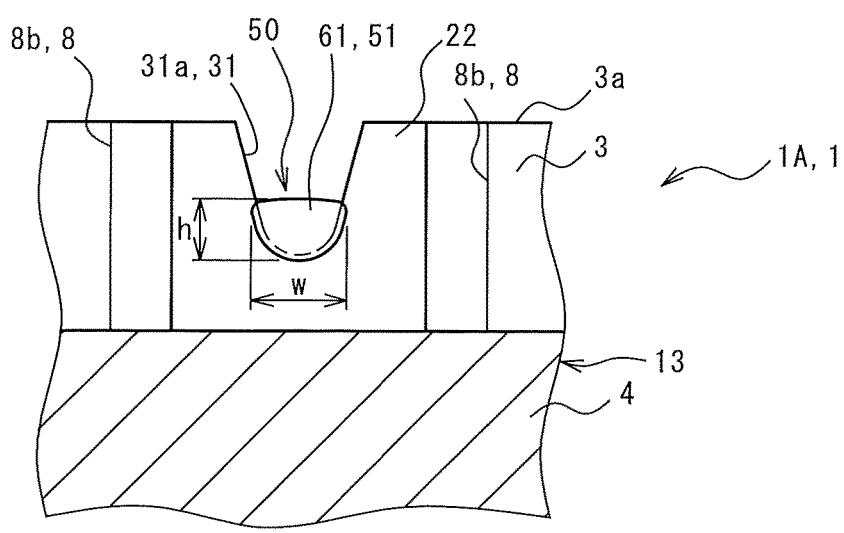
Figure 8:
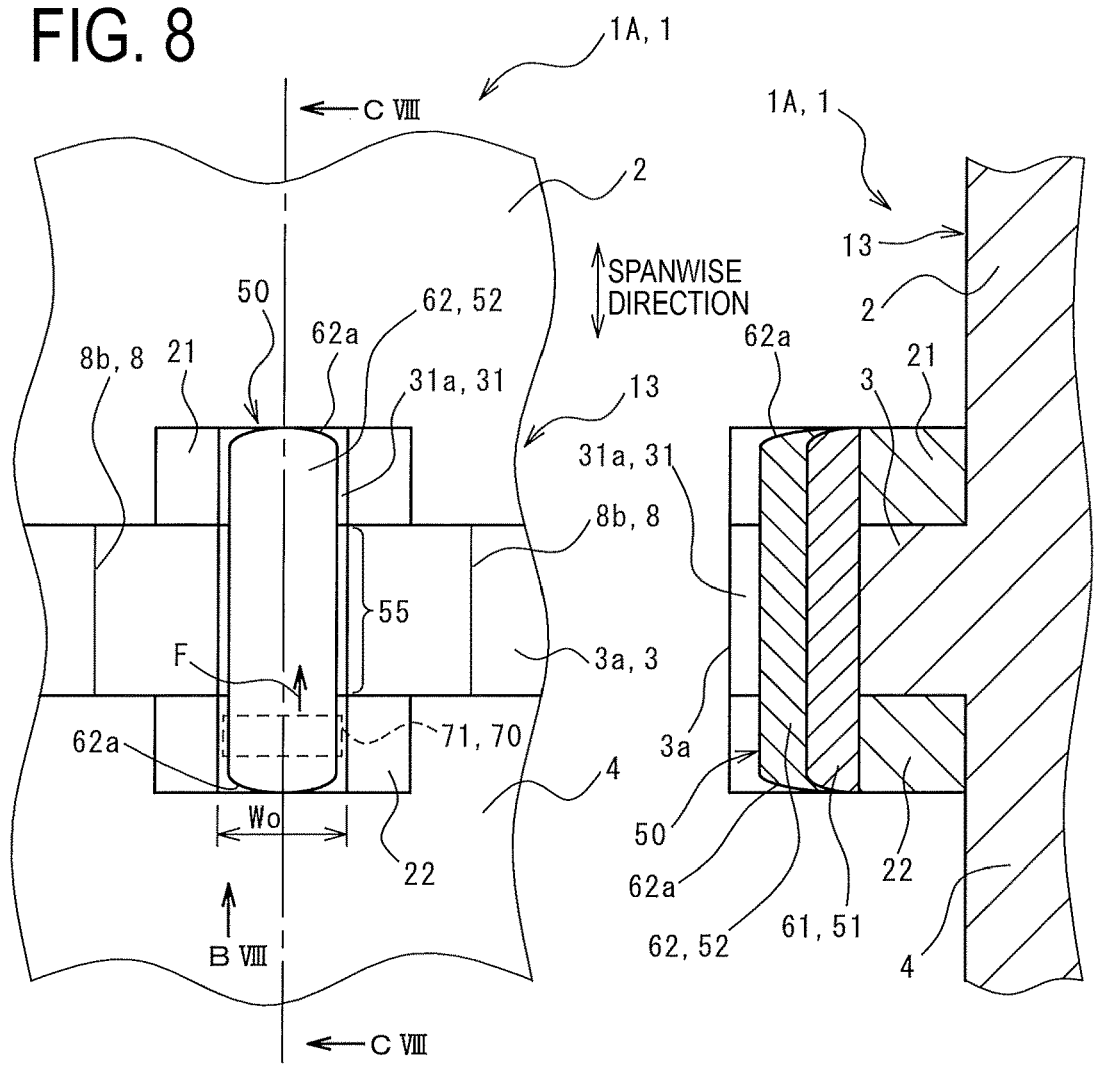
FIG. 8 is a figure showing a state after a second layer is formed in the groove part.
Figure 8:
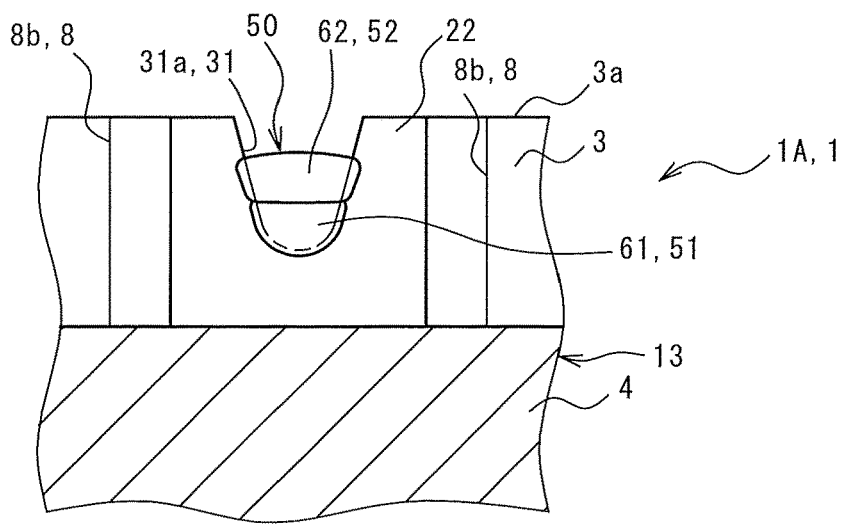
Figure 9:
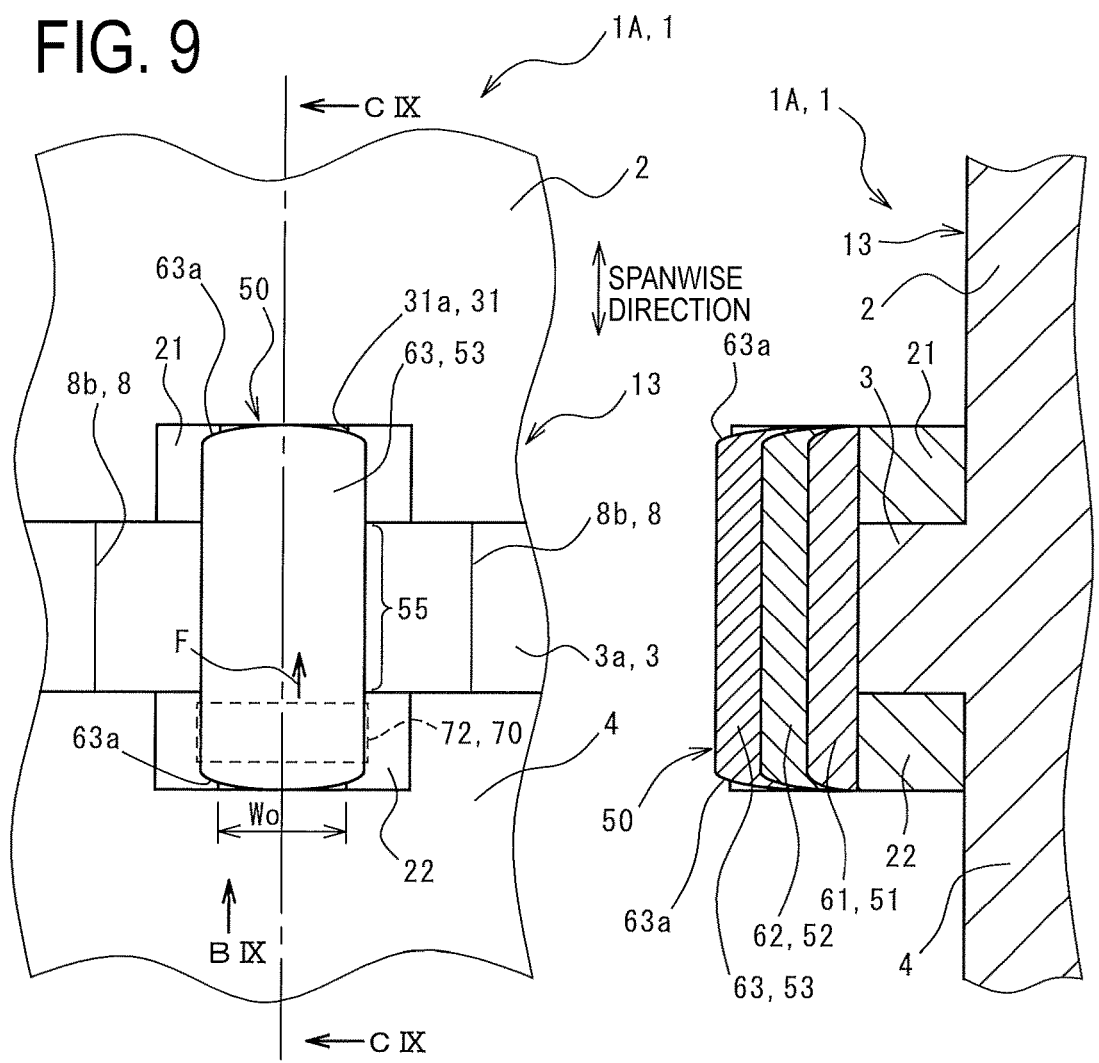
FIG. 9 is a figure showing a state after a third layer is formed in the groove part.
Figure 9:
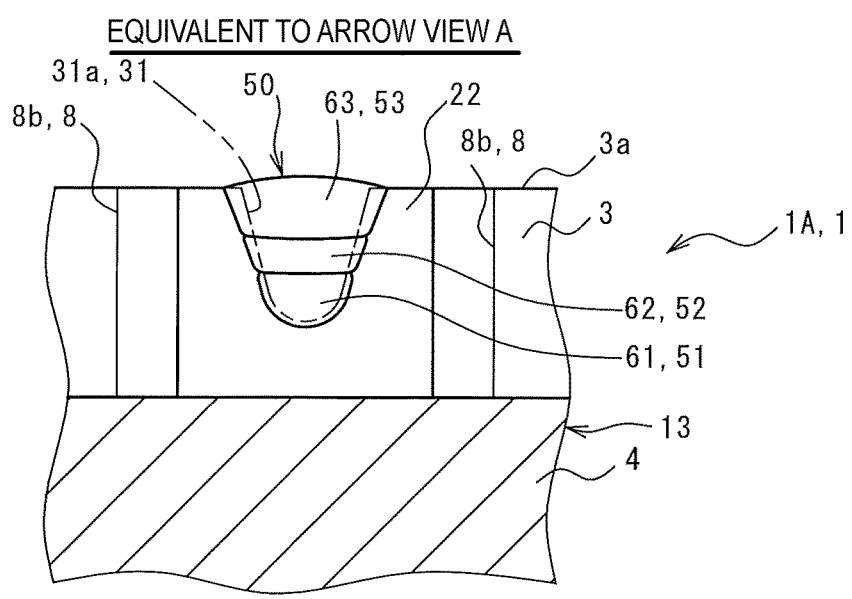

The welding step S100 is a step of forming the welded part 50 formed by a metal, which has a metal composition similar to that of the base material 13 and is used in welding with the base material 13, in the groove part 31 as shown in FIGS. 7 to 9.

It should be noted that FIG. 7 is a figure showing a state after a first layer 51 to be described later is formed in the groove part 31. FIG. 8 is a figure showing a state after a second layer 52 to be described later is formed in the groove part 31. FIG. 9 is a figure showing a state after a third layer 53 to be described later is formed in the groove part 31.

According to the unidirectionally solidified article repair method according to several embodiments, the welded part 50 does not overlap on the aforementioned other crystal grain boundary 8b as described above. Thus, it can be suppressed that the other crystal grain boundary 8b is affected by the formation of the welded part 50.

For example, if the welded part 50 is formed using an alloy material different from the base material 13 to improve weldability, the strength of the welded part 50 may become drastically lower than that of the base material 13.

In that respect, according to the unidirectionally solidified article repair method according to several embodiments, since the welded part 50 has a metal composition similar to that of the base material 13, the strength of the turbine rotor blade 1A, which is the repaired unidirectionally solidified article 1, can be ensured.

That the welded part 50 has a metal composition similar to that of the base material 13 also includes a case where the material used to form the welded part 50 has a component ratio different from that of the base material since volatilization at the time of welding is, for example, considered besides a case where the material type of the welded part 50 and that of the base material 13 are the same.

An example of a component composition is described. That the welded part 50 has a metal composition similar to that of the base material 13 includes a case where both the welded part 50 and the base material 13 contain Co: 5 to 12%, Cr: 5 to 12%, Mo: 0.5 to 3.0%, W: 3.0 to 6.0%, Al: 5.5 to 7.2%, Ti: 1.0 to 3.0%, Ta: 1.5 to 6.0%, Re: 0 to 2.0%, C: 0.01 to 0.20% in mass % and a remainder composed of Ni and unavoidable impurities as a component composition. It should be noted that at least either one of the welded part 50 or the base material 13 may contain one, two or more of B: 0.005 to 0.030%, Hf: 0.01 to 0.15% and Zr: 0.001 to 0.02% if necessary besides each of the above components.

According to the unidirectionally solidified article repair method according to several embodiments, the base material 13 and the welded part 50 are made of a nickel-based alloy or cobalt-based alloy. The high-temperature strength of the unidirectionally solidified article can be ensured by making the base material and the welded part of the nickel-based alloy or cobalt-based alloy in this way.

In the welding step S100, the welded part 50 is formed which includes the first layer 51 having one bead 61 and the second layer 52 adjacent to the first layer 51 in the depth direction of the groove part 31 and having one bead 62. It should be noted that, in the unidirectionally solidified article repair method according to several embodiments, the third layer 53 adjacent to the second layer 52 in the depth direction of the groove part 31 and having one bead 63 is further formed in the welding step S100.

In the case of multi-layer welding of welding a plurality of layers in the depth direction of the groove part 31, a chance of giving a thermal influence to the periphery of the groove part 31 at the time of welding increases as the number of beads in each layer increases.

In that respect, according to the unidirectionally solidified article repair method according to several embodiments, the thermal influence given to the periphery of the groove part 31 at the time of welding can be suppressed since each of the first, second and third layers 51, 52 and 53 has one bead.

It should be noted that the number of the layers in the welded part 50 is not limited to three layers described above and may be one or two layers or four or more layers according to the depth of the groove part 31, i.e. the depth of the crack 11.

In the welding step S100, the welded part 50 is formed by the laser metal deposition method.

In this way, even if the base material 13 is a material difficult to weld, the welded part 50 having a metal composition similar to that of the base material 13 can be provided in the groove part 31.

Further, since heat input into the welded part 50 at the time of welding is stabilized, for example, as compared to TIG welding or the like by using a laser beam, an electron beam or the like as a heat source of welding, variations of performances such as the strength of the welded part 50 can be suppressed.

As described above, the welded part 50 is formed in the welding step S100 while the partial region 40 is heated in the preheating step S50. Further, in the welding step S100, the welded part 50 including the first, second and third layers 51, 52 and 53 is formed with preheating by the preheating step S50 continued.

Accordingly, a stress generated in the first layer 51 to the third layer 53 can be reduced.

It should be noted that preheating by the preheating step S50 is finished after the third layer 53 is formed.

In the welding step S100, the welded part 50 is formed by welding along the extending direction of the groove part 31, i.e. the growth direction of the columnar crystals 6 in the groove part 31.

As described above, if the crack 11 along the one crystal grain boundary 8a is formed in the turbine rotor blade 1A, which is the unidirectionally solidified article 1 before the welded part 50 is formed, the extending directions of the groove part 31 and the welded part 50 are the same as the extending direction of the crack 11 if the extending direction of the groove part 31 is a direction along the growth direction of the columnar crystals 6. Thus, the unidirectionally solidified article repair method according to several embodiments is a repair method suitable for repairing the crack.

In the unidirectionally solidified article repair method according to several embodiments, the welded part 50 is formed in the groove part 31 by welding from one (e.g. tab 21) of the pair of tabs to the other (e.g. tab 22) of the pair of tabs through the welding region 55 in the welding step S100.

At a welding start position and a welding end position in one welding path, i.e. both end parts of the bead 61 to 63, a state of heat input at the time of welding is different from that in a part other than the both end parts 61a, 62a, 63a by starting or ending the welding. Further, since the bead 61 to 63 is not present outside the both end parts 61a, 62a, 63a in the extending direction of the bead 61 to 63, how thermal energy at the time of cooling escapes at the both end parts 61a, 62a, 63a is different from that in the part other than the both end parts 61a, 62a, 63a. Thus, a crack may be easily formed or it may be difficult to ensure strength or the like near the both end parts 61a, 62a, 63a.

In that respect, since welding is performed from one of the pair of tabs 21, 22 to the other of the pair of tabs 21, 22 through the welding region 55 according to the unidirectionally solidified article repair method according to several embodiments, the both ends of the bead 61 to 63 are located on the pair of tabs 21, 22 and the part of the bead 61 to 63 other than the both end parts 61a, 62a, 63a are located in the region (welding region 55) of the base material 13 where the welded part 50 is formed. Therefore, the strength of the welded part 50 in the welding region 55 can be ensured.

For example, in the case of repairing the platform 3 by welding as described above, steps are present between the end surface 3a of the platform 3 and the blade portion 2 and between the end surface 3a of the platform 3 and the shank 4, i.e. at both end positions of the welding region 55. Thus, in forming the welded part 50 by the laser metal deposition method, padding is hard to occur near both ends of the welding region 55.

In that respect, since the tabs 21, 22 are formed at the both end positions of the welding region 55 according to the unidirectionally solidified article repair method according to several embodiments, welding can be performed from the one of the pair of tabs 21, 22 to the other of the pair of tabs 21, 22 through the welding region 55 as described above and the difficulty of padding due to the aforementioned steps can be solved.

As described above, in the unidirectionally solidified article repair method according to several embodiments, the pair of tabs 21, 22 are formed to form the heat conduction path between the platform 3, which is the base material 13, and the tabs 21, 22.

If the heat conduction path is insufficiently formed between the tabs 21, 22 and the base material 13, thermal energy by welding may be insufficiently transferred to the base material 13 when the welded part 50 is formed on the tabs 21, 22 and the temperatures of the tabs 21, 22 may excessively increase. Depending on welding conditions, the tabs 21, 22 may be melted and dropped.

In that respect, since the thermal energy by welding can be sufficiently transferred to the base material 13 according to the unidirectionally solidified article repair method according to several embodiments, excessive temperature increases of the tabs 21, 22 can be suppressed.

(Regarding Shapes of Beads 61, 62 and 63)

In the unidirectionally solidified article repair method according to several embodiments, the first and second layers 51, 52 in which a ratio (h/w) of a height h of the bead 61, 62 to a width w of the bead 61, 62 is 0.8 or less are formed in the welding step S100 (see FIG. 7). It should be noted that, in the unidirectionally solidified article repair method according to several embodiments, the third layer 53 in which a ratio (h/w) of a height h of the bead 63 to a width w of the bead 63 is 0.8 or less is formed in the welding step S100.

As described above, if each layer 51, 52, 53 has one bead, the bottom surface of each bead 61, 62, 63 is in contact with the base material 13 or the bead of the lower layer and both side surfaces thereof are in contact with the base material 13. Thus, in the process of cooling and solidifying the melted bead 61, 62, 63, thermal energy possessed by the bead 61, 62, 63 is transferred from the bottom surface and the both side surfaces to the periphery, whereby the bead 61, 62, 63 is cooled.

Here, as the above ratio (h/w) increases, areas of the side surfaces of the bead 61, 62, 63 increase with respect to an area of the bottom surface of the bead 61, 62, 63. Thus, as the above ratio (h/w) increases, the thermal energy possessed by the bead 61, 62, 63 is more easily transferred to the periphery from the both side surfaces than from the bottom surface.

In the process of solidifying the bead 61, 62, 63, a region where temperature easily decreases first starts being solidified and a region where temperature hardly decreases is solidified later. Thus, as the above ratio (h/w) increases, the solidification of the bead 61, 62, 63 more easily proceeds from the both side surfaces toward a widthwise center. Conversely, as the above ratio (h/w) decreases, the solidification of the bead 61, 62, 63 more easily proceeds from the bottom surface toward the upper surface.

If the solidification of the bead 61, 62, 63 proceeds from the both side surfaces toward the widthwise center, a liquid phase part near the widthwise center may be opened and solidification cracking may occur if the bead 61, 62, 63 shrinks to generate a thermal stress as the bead 61, 62, 63 is solidified. To prevent such solidification cracking, it is desirable to make the solidification of the bead 61, 62, 63 easily proceed from the bottom surface to the upper surface by reducing the above ratio (h/w).

As a result of the earnest study of the inventors, it was found that, when each layer 51, 52, 53 had one bead as described above, the solidification cracking as described above could be suppressed if the above ratio (h/w) was 0.8 or less.

Therefore, the solidification cracking as described above can be suppressed according to the unidirectionally solidified article repair method according to several embodiments.

(Regarding Beam Pattern of Laser Beam)

As described above, the welded part 50 is formed by the laser metal deposition method in the unidirectionally solidified article repair method according to several embodiments.

A beam pattern at the time of forming each layer 51, 52, 53 is described below with reference to FIGS. 7 to 9.

In the unidirectionally solidified article repair method according to several embodiments, the welded part 50 is formed by irradiating a laser beam with a rectangular beam pattern 70 larger along a direction orthogonal to the spanwise direction than along the growth direction of the columnar crystals 6, i.e. the spanwise direction.

As a result of the earnest study of the inventors, if the amount of heat input in the laser metal deposition method is too much, the base material 13 below the bead to be formed or the bead in the lower layer is melted more than necessary. Thus, the amount of heat input is desirably suppressed so as not to be excessive. To that end, it is considered to suppress the size of a pattern in a scanning direction of the laser beam at the position of the bead 61, 62, 63 or to increase a scanning speed.

However, if the scanning speed is increased, the laser beam is separated from the formed bead 61, 62, 63 in a short time. Thus, a cooling rate of the formed bead 61, 62, 63 is increased and a thermal stress in the bead 61, 62, 63 tends to be high. Therefore, the scanning speed is desirably reduced. Further, if the scanning speed is reduced from the perspective of the amount of heat input, the size of the pattern in the scanning direction of the laser beam at the position of the bead 61, 62, 63 is desirably suppressed.

Accordingly, if the scanning direction of the laser beam is the same direction as the spanwise direction, it can be suppressed that the base material below the bead to be formed or the bead in the lower layer is melted more than necessary while the thermal stress of the bead 61, 62, 63 is suppressed, and the strength of the repaired unidirectionally solidified article 1 can be ensured by forming the rectangular beam pattern 70 larger along the direction orthogonal to the spanwise direction than along the spanwise direction.

In the unidirectionally solidified article repair method according to several embodiments, the first layer 51 is formed by irradiating a laser beam with a rectangular beam pattern 71 having a dimension along the direction orthogonal to the spanwise direction smaller than a width Wo of the groove part 31 in the surface of the base material 13 in the welding step S100 as shown in FIG. 7. Similarly, in the unidirectionally solidified article repair method according to several embodiments, the second layer 52 is formed by irradiating a laser beam with a rectangular beam pattern 71 having a dimension along the direction orthogonal to the spanwise direction smaller than the width Wo of the groove part 31 in the surface of the base material 13 in the welding step S100 as shown in FIG. 8.

In this way, a region outside the groove part 31 on the surface of the base material 13, which region needs not be irradiated with a laser beam, can be prevented from being irradiated with a laser beam when the first and second layers 51, 52 are formed.

It should be noted that, in the unidirectionally solidified article repair method according to several embodiments, the third layer 53 is formed by irradiating a laser beam with a rectangular beam pattern 72 having a dimension along the direction orthogonal to the spanwise direction larger than the width Wo of the groove part 31 in the surface of the base material 13 in the welding step S100 as shown in FIG. 9.

Further, in the unidirectionally solidified article repair method according to several embodiments, the intensity of the laser beam is desirably as constant as possible without depending on positions in the rectangular beam pattern 70 as described above. By forming the welded part 50 by the laser beam with such a beam pattern 70, a melted state of the base material 13 and the bead 61, 62, 63 is stabilized without depending on positions. Thus, variations of performances such as the strength of the welded part 50 can be suppressed.

It should be noted that a beam homogenizer may be used to form such a beam pattern 70 in the unidirectionally solidified article repair method according to several embodiments.

(Regarding Scanning of Laser Beam)

In the unidirectionally solidified article repair method according to several embodiments, the laser beam is scanned along the growth direction of the columnar crystals 6, i.e. the spanwise direction as indicated by an arrow F in FIGS. 7 to 9 in the welding step S100.

If the crack 11 along the one crystal grain boundary 8a is formed in the unidirectionally solidified article 1, the scanning direction of the laser beam, i.e. the extending direction of the bead 61, 62, 63, is the same direction as the extending direction of the crack 11 if the scanning direction of the laser beam is a direction along the growth direction of the columnar crystals 6. Therefore, according to the unidirectionally solidified article repair method according to several embodiments, the scanning direction of the laser beam is a direction suitable for repairing the crack 11.

In the unidirectionally solidified article repair method according to several embodiments, the welded part 50 is formed by scanning the laser beam at a scanning speed of 20 mm/min in the welding step S100.

As described above, the scanning direction of the laser beam is desirably reduced from the perspective of suppressing a thermal stress in the bead 61, 62, 63.

As a result of the earnest study of the inventors, it was found to be good to form the welded part 50 by scanning the laser beam at a scanning direction of 20 mm/min or less, more desirably at 10 mm/min or less.

Therefore, according to the unidirectionally solidified article repair method according to several embodiments, the thermal stress of the bead 61, 62, 63 can be suppressed and the strength of the repaired unidirectionally solidified article 1 can be ensured.

(Tab Removing Step S70)

The tab removing step S70 is a step of removing the pair of tabs 21, 22 from the turbine rotor blade 1A after the welding step S100 is finished.

In the tab removing step S70, the tabs 21, 22 and the welded part 50 formed on the tabs 21, 22 are removed from the turbine rotor blade 1A, for example, using a grinder or the like.

It should be noted that the tab removing step S70 may be performed after the heat treatment step S90 to be described next is finished.

(Heat Treatment Step S90)

The heat treatment step S90 is a step of thermally treating the turbine rotor blade 1A after the tab removing step S70 or the welding step S100 is finished. In the heat treatment step S90, a stabilization heating treatment or aging heat treatment is, for example, performed.

According to the turbine rotor blade 1A repaired by the unidirectionally solidified article repair method according to several embodiments, it can be suppressed that the above other crystal grain boundary 8b is affected by the formation of the welded part 50.

Further, according to the turbine rotor blade 1A repaired by the unidirectionally solidified article repair method according to several embodiments, the strength of the turbine rotor blade 1A can be ensured since the welded part 50 has a metal composition similar to that of the base material 13.

Although the unidirectionally solidified article has been described, taking the turbine rotor blade 1A as an example above, functions and effects similar to the above functions and effects can be obtained even if the unidirectionally solidified article is, for example, a turbine stationary blade or component constituting a combustor in a gas turbine.

That is, the unidirectionally solidified article 1 according to several embodiments includes the base material 13 made of the unidirectionally solidified alloy in which the plurality of crystal grain boundaries 8 are aligned in one direction, and the welded part 50 formed in the groove part 31 of the base material 13 and having a metal composition similar to that of the base material 13. In the unidirectionally solidified article 1 according to several embodiments, the welded part 50 overlaps only on the one crystal grain boundary 8a, out of the plurality of crystal grain boundaries 8.

Therefore, according to the unidirectionally solidified article 1 according to several embodiments, it can be suppressed that the above other crystal grain boundary 8b is affected by the formation of the welded part 50.

The unidirectionally solidified article 1 according to several embodiments includes the first layer 51 and the second layer 52. Each of the first and second layers 51, 52 is formed by one bead.

As described above, in the case of multi-layer welding of welding a plurality of layers in the depth direction of the groove part 31, a chance of giving a thermal influence at the time of welding to the periphery of the groove part 31 increases as the number of beads in each layer increases.

In that respect, according to the unidirectionally solidified article 1 according to several embodiments, the thermal influence at the time of welding given to the periphery of the groove part 31 can be suppressed since each of the first and second layers 51, 52 has one bead.

In the unidirectionally solidified article 1 according to several embodiments, the ratio (h/w) of the height h to the width w of the bead 61, 62, 63 is 0.8 or less.

Therefore, according to the unidirectionally solidified article 1 according to several embodiments, the solidification cracking as described above can be suppressed.

In the unidirectionally solidified article 1 according to several embodiments, the extending direction of the bead 61, 62, 63 is a direction along the growth direction of the columnar crystals 6 in the base material 13.

Therefore, according to the unidirectionally solidified article 1 according to several embodiments, the extending direction of the bead 61, 62, 63 is a direction suitable for repairing the above crack 11.

Figure 10:
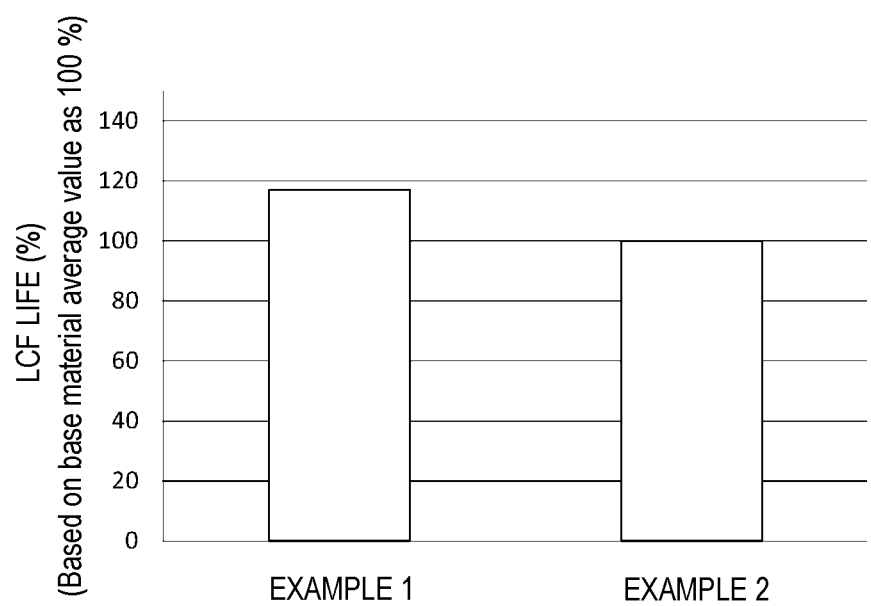
FIG. 10 is a graph showing a result of a high-temperature LCF (Low Cycle Fatigue) test for test pieces formed with a welded part according to the unidirectionally solidified article repair method according to the embodiments.

FIG. 10 is a graph showing a result of a high-temperature LCF (Low Cycle Fatigue) test for test pieces formed with a welded part 50 in accordance with the above unidirectionally solidified article repair method according to the above embodiments.

In this test, for the test piece, the welded part 50 having a metal composition similar to that of the test piece and formed by a metal used in welding with this test piece was formed in a groove part 31 formed in the test piece.

The high-temperature LCF test whose result is shown in FIG. 10 was conducted under conditions of a test piece temperature of 850° C. and a total distortion of 1.0%. The result is shown as Example 1 and Example 2 in FIG. 10.

As is clear from FIG. 10, high-temperature low-cycle fatigue strength in the welded part 50 of the test piece was confirmed to be equivalent to high-temperature low-cycle fatigue strength in a base material of the test piece.

The present disclosure is not limited to the above embodiments and also includes modifications of the above embodiments and appropriate combinations of these embodiments and modifications.

The invention claimed is:

1. A unidirectionally solidified article comprising:
a base material made of a unidirectionally solidified alloy in which a plurality of crystal grain boundaries are aligned in one direction; and
a welded part provided in a groove part of the base material, the welded part having a metal composition similar to that of the base material, the welded part being formed by a metal used in welding with the base material,
the welded part overlapping only on one of the plurality of crystal grain boundaries.

2. The unidirectionally solidified article according to claim 1, wherein
the welded part includes a first layer and a second layer adjacent to the first layer in a depth direction of the groove part, and
each of the first layer and the second layer is formed by one bead.

3. The unidirectionally solidified article according to claim 2, wherein a ratio of a height of the bead to a width of the bead is 0.8 or less.

4. The unidirectionally solidified article according to claim 1, wherein an extending direction of a bead is a direction along a growth direction of columnar crystals in the base material.

5. The unidirectionally solidified article according to claim 1, wherein the base material and the welded part are made of a nickel-based alloy or cobalt-based alloy.

6. A turbine rotor blade comprising the unidirectionally solidified article according to claim 1.

* * * * *